United States Patent
Chasles et al.

(10) Patent No.: US 6,652,261 B2
(45) Date of Patent: Nov. 25, 2003

(54) INJECTION PRESS FOR MOLDING PIECES OF ELASTOMER

(75) Inventors: Jean-Pierre Chasles, Cloyes sur le Loir (FR); Alain Vasseur, Chateaudun (FR); Patrick Vanhille, Beaugency (FR); Philippe Blot, St-Hilaire sur Yerre (FR)

(73) Assignee: Hutchinson, Paris (FR)

( * ) Notice: Subject to any disclaimer, the term of this patent is extended or adjusted under 35 U.S.C. 154(b) by 37 days.

(21) Appl. No.: 10/134,713

(22) Filed: Apr. 29, 2002

(65) Prior Publication Data

US 2002/0172736 A1 Nov. 21, 2002

(30) Foreign Application Priority Data

May 7, 2001 (FR) .............................. 01 06074

(51) Int. Cl.⁷ .............................................. B29C 45/66
(52) U.S. Cl. ...................... 425/547; 425/556; 425/576
(58) Field of Search ................................ 425/547, 574, 425/575, 576, 556

(56) References Cited

U.S. PATENT DOCUMENTS

| | | | |
|---|---|---|---|
| 3,574,894 A | | 4/1971 | Aoki |
| 3,746,491 A | * | 7/1973 | Daly et al. .................. 425/576 |
| 3,833,329 A | * | 9/1974 | Ulmachneider et al. .... 425/556 |
| 3,888,615 A | * | 6/1975 | Ulmschneider et al. ..... 425/575 |
| 3,915,608 A | * | 10/1975 | Hujik .......................... 425/576 |
| 5,253,999 A | * | 10/1993 | Kosuge ....................... 425/575 |

FOREIGN PATENT DOCUMENTS

| | | |
|---|---|---|
| FR | 1286221 | 3/1962 |
| FR | 1453413 | 6/1966 |
| GB | 913532 | 12/1962 |
| GB | 1101913 | 2/1968 |
| WO | WO 95/11792 | 5/1995 |

* cited by examiner

Primary Examiner—Tim Heitbrink
(74) Attorney, Agent, or Firm—Marshall, Gerstein & Borun LLP

(57) ABSTRACT

An injection press for molding pieces of elastomer comprises a fixed platen, a moving platen, and a turret carrying a plurality of molds, the turret and the molds being interposed between the two platens so as to be capable of being clamped between them in order to close the molds, and the turret being mounted to rotate so as to move each mold sequentially between an injection station, vulcanization stations, and an unmolding station. The press also comprises an injector device adapted to inject elastomer into each mold while it is in the injection station, heater devices adapted to heat the molds, and a control device adapted to move the moving platen and to cause the turret to turn.

14 Claims, 3 Drawing Sheets

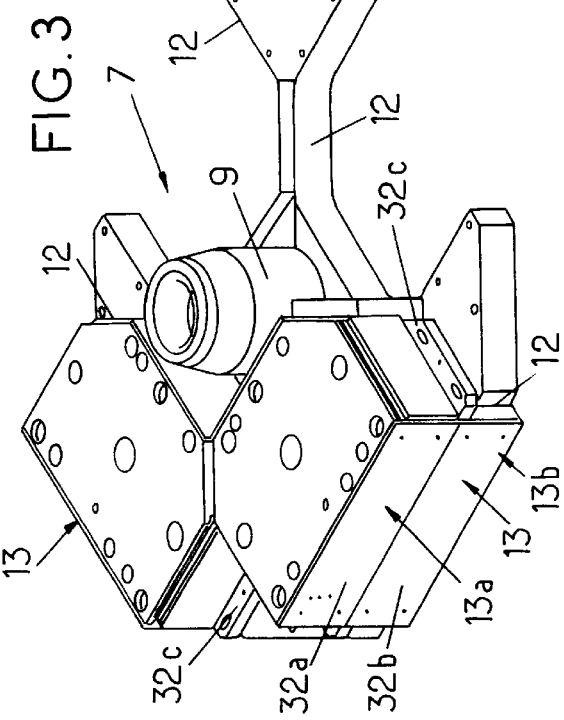
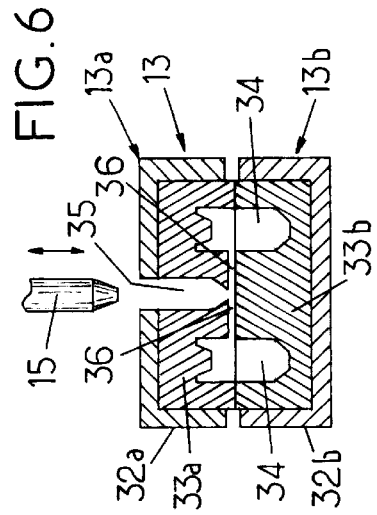
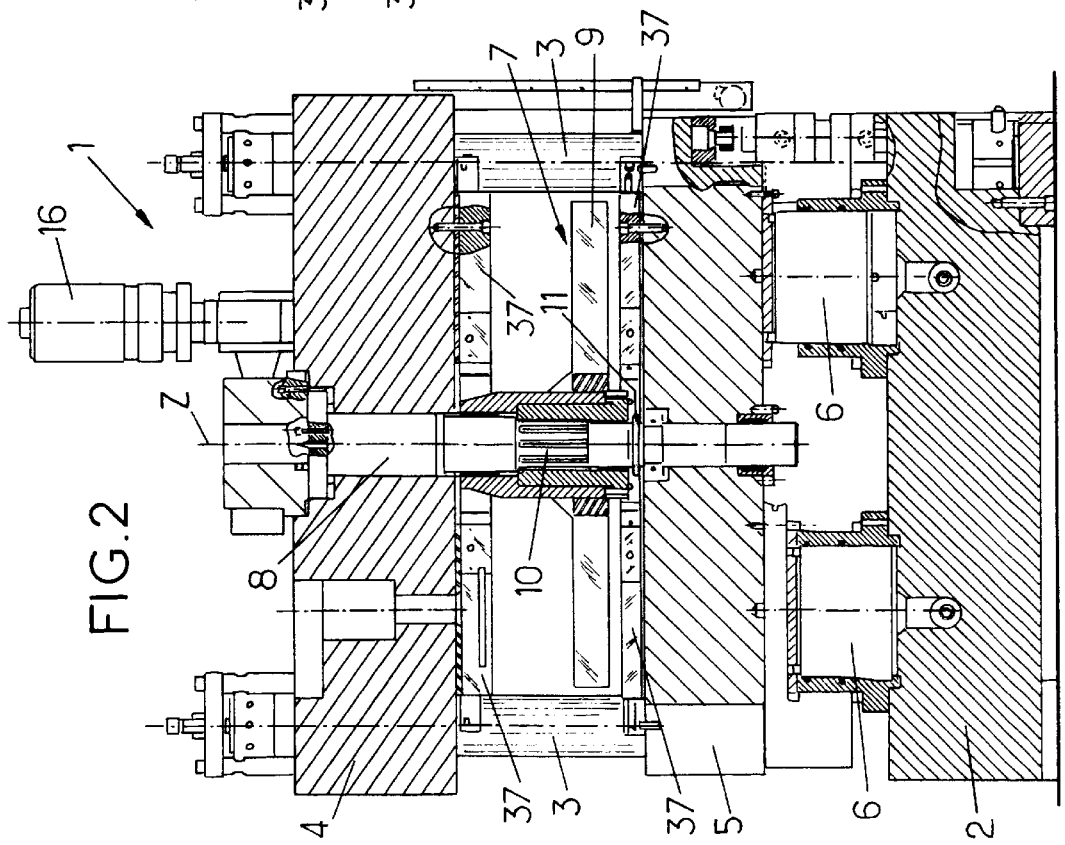

INJECTION PRESS FOR MOLDING PIECES OF ELASTOMER

The present invention relates to injection presses for molding pieces of elastomer.

More particularly, the invention relates to an injection press for molding pieces of elastomer and comprising:

first and second substantially parallel platens slidably displaceable relative to each other along a central axis between a closed position in which said first and second platens are relatively close to each other and an open position in which said first and second platens are further apart from each other;

a molding device comprising at least one mold, itself comprising two mold portions that are movable relative to each other along said central axis between a closed position in which said two mold portions are in closed contact to enable at least one elastomer piece to be molded, and an open position enabling said elastomer piece to the unmolded, said molding device being placed between the first and second platens;

an injector device adapted to inject elastomer into the mold;

at least one heater device adapted to heat the elastomer contained in the mold in order to vulcanize it; and a control device comprising at least one jack adapted to move the first and second platens between their open and closed positions.

BACKGROUND OF THE INVENTION

Known presses of that type make it possible for the cavities to be unmolded only all together, once all of the molded elastomer pieces have been injected and vulcanized in the cavities of the molding device. Those presses thus have an operating cycle that is quite long, given that vulcanization can last for several minutes. To compensate for that handicap, the molding device generally has a large number of cavities (for example 16 cavities) in order to make it possible to achieve a fairly high rate of production.

Those known presses give satisfaction as to the effectiveness with which the molding device is closed and as to their compactness.

Nevertheless, they suffer from the following drawbacks:

their elastomer injector devices are particularly expensive insofar as they must be capable of filling a large number of cavities simultaneously;

their injector devices are used for a small fraction of the time only, and are therefore not very productive, which is particularly troublesome in equipment that is expensive, as mentioned above;

since the molding device has a large number of cavities, the cavities are connected to an injector device via relatively long lengths of feed channel, thus giving rise to significant losses of material during molding: the elastomer present in such channels is itself vulcanized while the molded pieces are vulcanizing, and the vulcanized rubber present in the channels at the end of molding cannot be recycled; and because of the great length of the feed channels, the elastomer needs to be injected at a temperature that is relatively low in order to ensure that it does not begin to vulcanize in the channels before it has filled the cavities: this gives rise to vulcanization that is slower, since longer heating is required in the cavities.

OBJECTS AND SUMMARY OF THE INVENTION

A particular object of the present invention is to mitigate those drawbacks.

To this end, according to the invention, in an injection press of the kind in question:

the molding device includes a turret which is rotated by a shaft disposed on said central axis and which carries a number n not less than 2 of independent molds, the molds being movable by rotation of the turret between a number p of fixed stations, where p is not less than n, and these stations include at least one injection station and an unmolding station; and when they are in the closed position, the first and second platens are adapted to clamp against each other in the closed position the two mold portions belonging to each mold that is in a station other than the unmolding station, while enabling a mold that is in the unmolding station to be opened.

By means of these dispositions, each mold is caused to pass in succession through the various stations of the injection press. During each of these movements, the elastomer piece(s) present in the mold that is in the unmolding station is/are unmolded.

This makes it possible to obtain rates of throughput that are quite high without it being necessary to use molds having numerous cavities. It is thus possible to use an elastomer injector device that is of low cost. In addition, this also makes it possible to limit the length of the cavity feed channels within the molds, thus serving firstly to limit losses of material, and secondly to enable the elastomer to be injected at a higher temperature, giving rise to vulcanization that takes place more quickly.

Finally, the injector devices of presses of the invention are in use during a large fraction of the time, and are therefore more productive.

In preferred embodiments of the invention, use can optionally be made of one or more of the following dispositions:

the control device is adapted cyclically to move the first and second platens apart, to turn the turret so as to cause the molds to pass from one station to another, and then to move said first and second platens towards each other so as to clamp the two mold portions against each other in the closed position for each mold that is to be found in a station other than the unmolding station;

the first and second platens are stationary in rotation about the central axis and at least one of the first and second platens presents a notch corresponding with the unmolding station to enable the mold that is in the unmolding station to be opened while said first and second platens are in their closed position;

the first platen is slidably mounted on peripheral columns parallel to the shaft and placed around the turret;

the first platen is slidably mounted on a fixed structure secured to the second platen, the central axis is substantially vertical, the first platen is placed beneath the second platen, the turret is mounted to slide freely with lost motion on the shaft, said shaft including an abutment which limits downward sliding of the turret, and the control device is adapted to lower the first platen sufficiently to enable the turret to come to bear against said abutment of the shaft and to ensure that the molding device is not in contact with the first and second platens when said first and second platens are in the open position;

the number p of stations is equal to the number n of molds;

the number n of molds is not less than four;

the stations comprises p–2 vulcanization stations;

at least some stations include heater devices (the heater devices are thus stationary, which avoids the need to use rotary electrical connections);

at least some of the heater devices of the stations comprise respective heater surfaces secured to one of said first and second platens;

each mold is adapted to mold simultaneously a number of elastomer pieces lying in the range 1 to 4;

each mold portion comprises an outer shell fixed to the turret and a block which is supported by said shell and which presents an inside shape complementary to the elastomer piece to be molded;

the control device comprises at least first and second jacks, the first jack being placed to correspond with the injection station and the second jack being diametrically opposite the first jack about the central axis; and each mold comprises a top mold portion and a bottom mold portion, and the unmolding station has a mold opening device adapted to raise the top mold portion to separate it from the bottom mold portion.

BRIEF DESCRIPTION OF THE DRAWINGS

Other characteristics and advantages of the invention appear from the following description of an embodiment given as a non-limiting example and with reference to the accompanying drawings.

In the drawings:

FIG. 2 is a vertical section through the FIG. 1 press;

FIG. 3 is a perspective view of a mold-carrying turret belonging to the FIG. 1 press;

FIG. 6 is a vertical section view showing an embodiment of molds for the FIG. 1 press.

MORE DETAILED DESCRIPTION

In the various figures the same references designate elements that are identical or similar.

Figure 1:
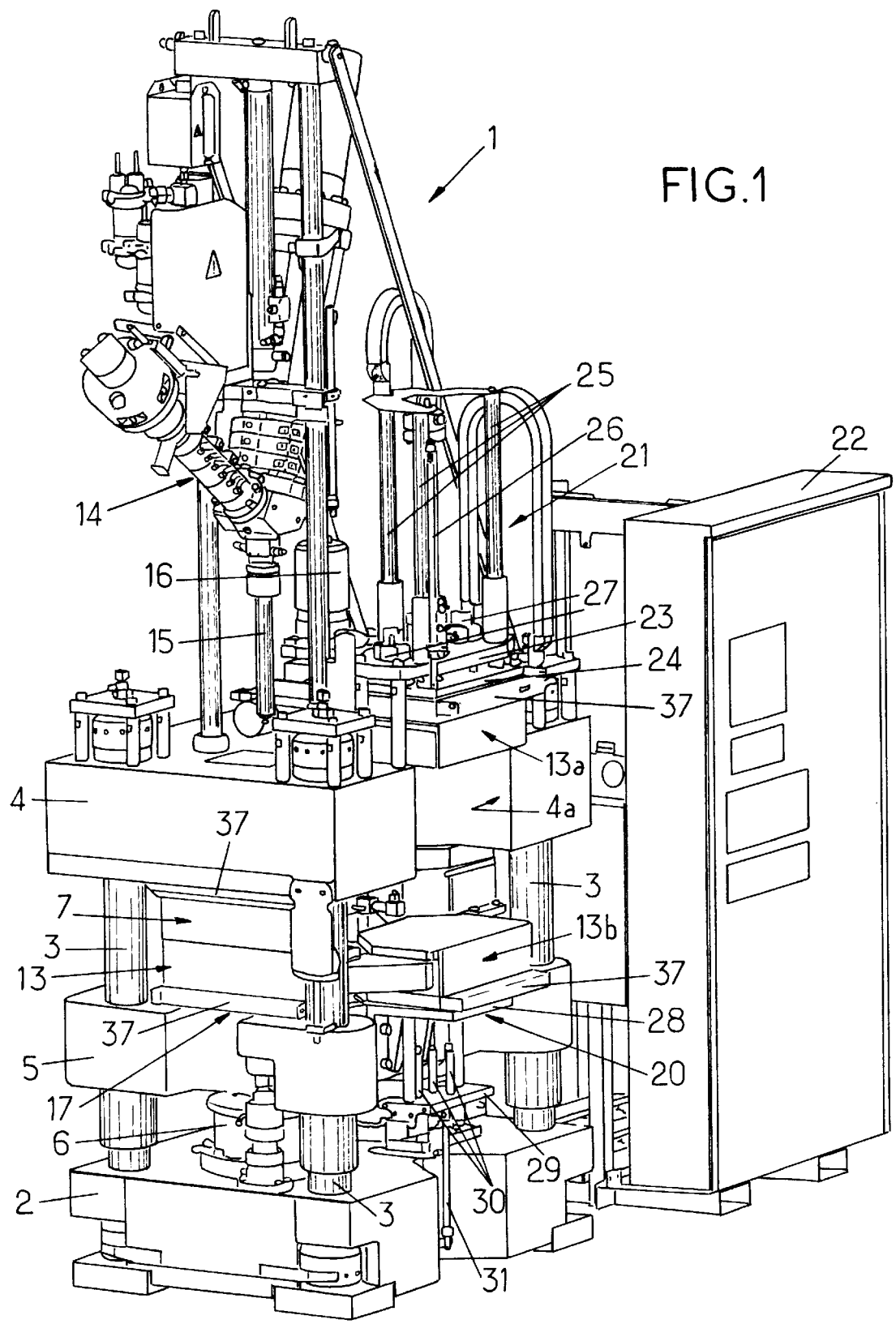
FIG. 1 is a perspective view of an injection press constituting an embodiment of the invention.

FIG. 1 shows an injection press 1 for rubber or similar elastomer materials, the press constituting an embodiment of the invention.

This injection press comprises a stationary structure itself comprising:

a base 2 fixed to the ground;

four vertical cylindrical columns 3 fixed to the base 2; and a stationary horizontal top platen 4, fixed to the columns 3.

In addition, the injection press also comprises a moving horizontal bottom platen 5 which is located between the base 2 and the stationary platen 4 and which is mounted to slide vertically on the columns 3. The moving platen 5 can be moved upwards to an "open" position, and downwards to a "closed" position by means of two hydraulic jacks 6 interposed between said moving platen and the base 2.

In addition, a molding device 7 which extends substantially horizontally is interposed between the moving platen 5 and the stationary platen 4. This molding device is mounted to rotate between the columns 3 about a vertical axis Z by means of a vertical control shaft 8 which can clearly be seen in FIG. 2.

This shaft 8 supports a mold-carrying turret 9 which is constrained to rotate with said shaft 8 by means of axial fluting 10 on the shaft 8 engaged in complementary fluting in the turret 9.

In addition, the turret 9 can slide vertically over a certain distance relative to the shaft 8. This sliding is limited by an abutment such as a collar 11 secured to the shaft 8 and placed beneath the turret 9.

As shown in FIG. 3, the turret 9 presents a plurality of radially outwardly open notches 12 each adapted to receive a mold 13. In the example shown, the turret 9 has four notches 12 disposed at 90° intervals to one another and is consequently adapted to carry four molds 13, however the invention applies equally to an injection press having a turret 9 adapted to carry at least two molds 13, and where appropriate as many as six or even eight molds 13.

Each of the molds 13 comprises a top mold portion 13a and a bottom mold portion 13b, which are separable from each other to open the mold and unmold elastomer pieces that have been formed in the mold.

Figure 5:
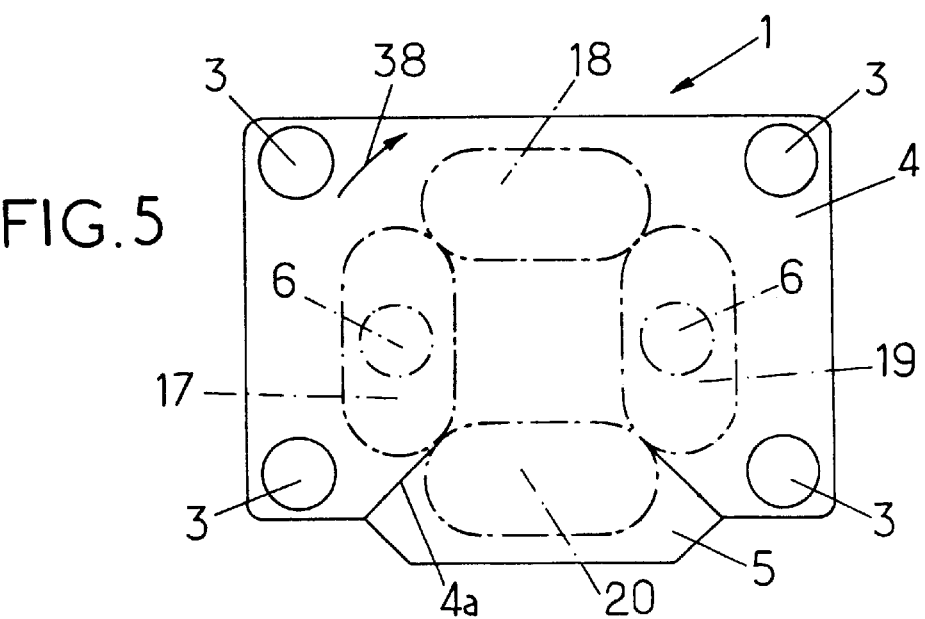
FIG. 5 is a diagrammatic top view showing the various stations in the FIG. 1 press.

Furthermore, as shown in FIG. 1, the injection press also comprises:

an injection head 14 for injecting rubber, the head being terminated by an injection nozzle 15 that is vertically movable (on its own or with the head assembly);

a motor 16 for driving the shaft 8 to turn the molding device 7 about the axis Z, so as to be able to position each mold 13 sequentially and successively in an injection station 17 situated beneath the injection head 14, in two vulcanization stations 18 and 19, and in an unmolding station 20 (see FIG. 5);

a mold-opening device 21 situated in the unmolding station 20; and a control cabinet 22, e.g. containing a programmable controller which controls the entire injection press.

Figure 4:
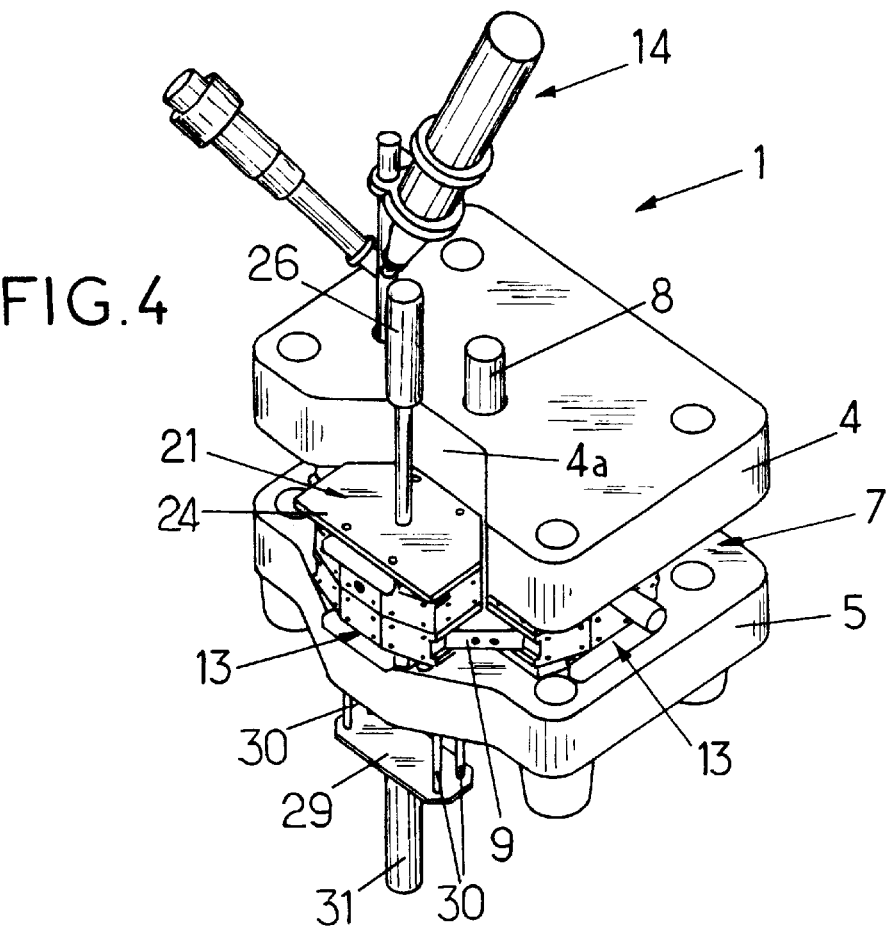
FIG. 4 is a fragmentary diagrammatic view of the FIG. 1 press shown in perspective.

As shown in greater detail in FIGS. 1 and 4, the stationary top platen 4 can advantageously include a notch 4a that is complementary in shape to the molds 13 so as to enable the top portion 13a of a mold to slide vertically through said notch.

In addition, the mold-opening device 21 can further comprise, for example:

a stationary top plate 23 mounted at a certain distance above the top platen 4;

a moving platen 24 mounted to slide vertically relative to the fixed plate 23 by means of three guide columns 25 and controlled by an actuator 26; and two locking actuators 27 carried by the moving platen 24 and adapted to lock the top portion 13a of a mold beneath this moving platen, the locking actuators 27 optionally being constituted by "quarter turn" type actuators, e.g. actuators sold under the trademark "CYTRAC" by CITEC, France.

Furthermore, in the unmolding station 20, the moving platen 5 includes a support plate 28 placed above a moving bottom plate 29 which carries upwardly-projecting actuating rods 30.

This moving plate 29 is vertically movable by means of an actuator 31 so as to cause the rods 30 to penetrate into recesses (not shown) in the support plate 28 and the bottom portion 13b of the mold situated in the unmolding station. The rods 30 can thus act as ejectors (not shown but known per se) located in the bottom portion 13b of the mold to eject the elastomer piece(s) formed in the mold 13 that is to be found in the unmolding station.

As can be seen in particular in FIGS. 1 and 2, heater plates 37 are fixed beneath the stationary top platen 4, beneath the moving top plate 24, on the moving bottom platen 5, and on the support plate 28, respectively in the locations of the four stationary stations 17 to 20 mentioned above. These heater plates 37 are heated electrically on a continuous basis so that when the bottom platen 5 is raised into the closed position by the hydraulic jacks 6, said heater plates deliver heat to the molds 13, enabling the raw rubber previously injected into said molds to be vulcanized.

Finally, as shown in FIG. 6, each of the top portion 13a and the bottom portion 13b of each mold 13 preferably comprises two parts:

a respective outer shell 32a, 32b of standard shape, which shell is adapted to be carried by the turret 9 (for this purpose, the bottom shell 32b can include bearing rims 32c adapted to bear against said turret 9); and a respective inner block 33a, 33b which is shaped to mold the elastomer piece(s) in one or more mold cavities 34 (in practice there are 1 to 4 mold cavities).

It is thus possible to reuse the shells 32a, 32b regardless of the pieces that are molded in the injection press, and when the type of piece being manufactured by means of said injection press is changed, it is only of the blocks 33a, 33b that are changed inside the shells 32a, 32b.

As can be seen in FIG. 6, the top shell 32a and the top block 33a advantageously define a vertical channel 35 adapted to receive the injection nozzle 15 of the head 14, said vertical channel 35 opening out into the mold cavity (ies) 34 of the mold 13 via horizontal channels 36.

The above-described injection press operates as follows: at regular time intervals, e.g. lying in the range a few seconds to a few tens of seconds, the moving bottom platen 5 is lowered by the jacks 6 so that the turret 9 carrying the molds 13 comes to rest on the collar 11 of the shaft 8: once the platen 5 has been lowered far enough, the molding device 17 is no longer in contact with the stationary portions of the press.

The programmable controller contained in the cabinet 22 then causes the motor 16 to rotate and turn the shaft 8 through one-fourth of a turn in the direction of arrow 38 as shown in FIG. 5.

Thus, the empty mold 13 which was previously in the unmolding station 20 is put into position in the injection station 17, while the molds 13 whose blocks are filled with rubber and which were previously in the stations 17 to 19 are now to be found respectively in the stations 18 to 20.

It should be observed that this rotation is easy to perform since the molds 13 are not rubbing against any stationary portions.

It should also be observed that during rotation of the molding device 7, each of the molds 13 can open slightly ajar, which is no impediment and can even serve, where appropriate, to allow gas to escape from the molds. Should it be desirable to keep the molds 13 closed hermetically, even when the moving platen 5 is in the open position, it would be possible to provide a locking device (not shown) between the top portion 13a and the bottom portion 13b of each mold.

After the molding device 7 and has turned, the moving pattern 5 is raised again by means of the hydraulic jacks 6, which jacks are advantageously situated in correspondence respectively with the injection station 17 and with the vulcanization station 19. The molds 13 situated in the injection station 17 and in the vulcanization stations 18 and 19 are thus re-closed hermetically by being clamped between the platens 4 and 5. These molds 13 are then heated by the heater plates 37, such that the molds 13 are maintained at a temperature suitable for enabling the rubber to vulcanize (during the periods while the press is open, the thermal inertia of the molds 13 enables these molds to remain at a temperature suitable for continuing vulcanization of the rubber).

Once the platen 5 is in the closed position, the injection nozzle 15 is lowered so as to penetrate into the channel 35 of the mold 13 situated in the injection station 17 (see FIG. 6), such that the mold cavity(ies) 34 of the mold 13 are filled with the raw rubber which then begins to vulcanize under the effect of the temperature of the mold 13 in question.

During this time, the molds 13 that are already filled with rubber and that are situated in the vulcanization stations 18 and 19 continue the vulcanization process.

Finally, and simultaneously, the moving platen 24 of the unmolding device is pressed against the top portion 13a of the mold 13 situated in the unmolding station 20, and the locking actuators 27 are actuated to connect said top portion 13a of the mold with the moving platen 24, after which said moving platen 24 is raised by means of the actuator 26, and it passes through the notch 4a in the stationary top platen 4.

In addition, the moving bottom plate 29 is then raised by means of the actuator 31 so that the top rods 30 secured to said platen 29 penetrate into the bottom portion 13b of the mold through the support plate 28, thereby unmolding the elastomer piece(s) initially contained in the mold 13 situated in the unmolding station 20.

The piece(s) unmolded in this way are then removed manually or automatically (by means not shown), after which the bottom plate 29 is again lowered and the moving platen 24 is itself lowered so as to place the top portion 13a of the mold on the bottom portion 13b. The locking actuators 27 are then actuated to release said top portion 13a of the mold, and the platen 24 is then raised again.

It should be observed that during these operations, the top and bottom portions 13a and 13b of the mold situated in the unmolding station 20 continue to be maintained at high temperature by the heater plates 37 situated in the unmolding station.

Thereafter, the press 1 cyclically repeats the above-described sequences so as to mold other elastomer pieces.

What is claimed is:

1. An injection press for molding pieces of elastomer and comprising:

first and second substantially parallel platens slidably displaceable relative to each other along a central axis between a closed position in which said first and second platens are relatively close to each other and an open position in which said first and second platens are further apart from each other;

a molding device comprising at least one mold, itself comprising two mold portions that are movable relative to each other along said central axis between a closed position in which said two mold portions are in closed contact to enable at least one elastomer piece to be molded, and an open position enabling said elastomer piece to the unmolded, said molding device being placed between the first and second platens;

an injector device adapted to inject elastomer into the mold;

at least one heater device adapted to heat the elastomer contained in the mold in order to vulcanize it; and a control device comprising at least one jack adapted to move the first and second platens between their open and closed positions;

wherein the molding device includes a turret which is rotated by a shaft disposed on said central axis and which carries a number n not less than 2 of independent molds, the molds being movable by rotation of the turret between a number p of fixed stations, where p is not less than n, and these stations include at least one injection station and an unmolding station;

and wherein, when they are in the closed position, the first and second platens are adapted to clamp against each other in the closed position the two mold portions belonging to each mold that is in a station other than the unmolding station, while enabling a mold that is in the unmolding station to be opened.

2. An injection press according to claim 1, in which the control device is adapted cyclically to move the first and second platens apart, to turn the turret so as to cause the molds to pass from one station to another, and then to move said first and second platens towards each other so as to clamp the two mold portions against each other in the closed position for each mold that is to be found in a station other than the unmolding station.

3. An injection press according to claim 1, in which the first and second platens are stationary in rotation about the central axis and at least one of the first and second platens presents a notch corresponding with the unmolding station to enable the mold that is in the unmolding station to be opened while said first and second platens are in their closed position.

4. An injection press according to claim 1, in which the first platen is slidably mounted on peripheral columns parallel to the shaft and placed around the turret.

5. An injection press according to claim 1, in which the first platen is slidably mounted on a fixed structure secured to the second platen, the central axis is substantially vertical, the first platen is placed beneath the second platen, the turret is mounted to slide freely with lost motion on the shaft, said shaft including an abutment which limits downward sliding of the turret, and the control device is adapted to lower the first platen sufficiently to enable the turret to come to bear against said abutment of the shaft and to ensure that the molding device is not in contact with the first and second platens when said first and second platens are in the open position.

6. An injection press according to claim 1, in which the number p of stations is equal to the number n of molds.

7. An injection press according to claim 1, in which the number n of molds is not less than four.

8. An injection press according to claim 1, in which the stations comprises p−2 vulcanization stations.

9. An injection press according to claim 1, in which at least some stations include heater devices.

10. An injection press according to claim 9, in which at least some of the heater devices of the stations comprises respective heater surfaces secured to one of said first and second platens.

11. An injection press according to claim 1, in which each mold is adapted to mold simultaneously a number of elastomer pieces lying in the range 1 to 4.

12. An injection press according to claim 1, in which each mold portion comprises an outer shell fixed to the turret and a block which is supported by said shell and which presents an inside shape complementary to the elastomer piece to be molded.

13. An injection press according to claim 1, in which the control device comprises at least first and second jacks, the first jack being placed to correspond with the injection station and the second jack being diametrically opposite the first jack about the central axis.

14. An injection press according to claim 1, in which each mold comprises a top mold portion and a bottom mold portion, and the unmolding station has a mold-opening device adapted to raise the top mold portion to separate it from the bottom mold portion.

* * * * *